US010637089B2

(12) United States Patent
Sievers et al.

(10) Patent No.: US 10,637,089 B2
(45) Date of Patent: Apr. 28, 2020

(54) METHOD AND APPARATUS FOR BIO-ELECTRICALLY GENERATING POWER FROM ORGANIC INGREDIENTS OF A WASTE WATER

(71) Applicants: Eisenhuth GmbH & Co. KG, Osterode (DE); Clausthaler Umwelttechnikinstitut GmbH (CUTEC-Institut), Clausthal-Zellerfeld (DE); Ulrich Kunz, Osterode (DE)

(72) Inventors: Michael Sievers, Clausthal-Zellerfeld (DE); Ulrich Kunz, Osterode (DE); Thorsten Hickmann, Osterode (DE)

(73) Assignees: EISENHUTH GMBH & CO. KG, Osterode (DE); TECHNISCHE UNIVERSITAET CLAUSTHAL, Clausthal-Zellerfeld (DE)

( * ) Notice: Subject to any disclaimer, the term of this patent is extended or adjusted under 35 U.S.C. 154(b) by 225 days.

(21) Appl. No.: 15/604,788

(22) Filed: May 25, 2017

(65) Prior Publication Data

US 2017/0346122 A1 Nov. 30, 2017

(30) Foreign Application Priority Data

May 25, 2016 (DE) .................. 10 2016 109 606

(51) Int. Cl.
*H01M 8/16* (2006.01)
*H02M 3/02* (2006.01)
(Continued)

(52) U.S. Cl.
CPC .......... *H01M 8/16* (2013.01); *C02F 1/46176* (2013.01); *C02F 3/005* (2013.01); *C02F 3/101* (2013.01);
(Continued)

(58) Field of Classification Search
CPC ....... H01M 8/16; C02F 3/101; C02F 1/46176; C02F 3/005; C02F 2201/46145;
(Continued)

(56) References Cited

U.S. PATENT DOCUMENTS 3,340,094 A 9/1967 Helmuth et al.
7,695,834 B1* 4/2010 Borole ................ H01M 4/8605
427/115

(Continued)

FOREIGN PATENT DOCUMENTS

DE 20 2005 001 102 U1 3/2005
WO 2009/008709 A1 1/2009
WO 2011/006939 A2 1/2011

OTHER PUBLICATIONS

Salvador Carreon-Bautista et al. "An Inductorless DC-DC Converter for an Energy Aware Power Management Unit Aimed at Microbial Fuel Cell Arrays" IEEE Journal of Emerging and Selected Topics in Power Electronics, Piscataway, NJ, USA, vol. 3, No. 4, 1., Dec. 2015, XP011588717, ISSN: 2168-6777.

(Continued)

*Primary Examiner* — Lisa S Park
(74) *Attorney, Agent, or Firm* — Thomas | Horstemeyer, LLP

(57) ABSTRACT

For bio-electrically generating electric power from organic ingredients of a waste water flowing in a flow direction, an anode is immersed in the waste water in a first spatial area, and oxygen is supplied to a cathode which is electrically connected to the anode and arranged in a second spatial area delimited from the first spatial area by means of a proton-permeable membrane. A voltage between the anode and the cathode is increased by a DC/DC converter located at the anode and the cathode, and a further voltage between a further anode in said or a further first spatial area and a further cathode in said or a further second spatial area is (Continued)

increased by a further DC/DC converter located at the further anode and the further cathode. A DC voltage link is charged with the DC/DC converter and the further DC/DC converter connected in parallel to the DC voltage link.

16 Claims, 4 Drawing Sheets

(51) Int. Cl.
*C02F 3/00* (2006.01)
*C02F 3/10* (2006.01)
*C02F 1/461* (2006.01)
*C02F 1/66* (2006.01)
*C02F 3/20* (2006.01)
*C02F 3/30* (2006.01)

(52) U.S. Cl.
CPC ............... *C02F 1/66* (2013.01); *C02F 3/208* (2013.01); *C02F 3/303* (2013.01); *C02F 2001/46157* (2013.01); *C02F 2201/4614* (2013.01); *C02F 2201/4617* (2013.01); *C02F 2201/4619* (2013.01); *C02F 2201/46115* (2013.01); *C02F 2201/46135* (2013.01); *C02F 2201/46145* (2013.01); *C02F 2209/40* (2013.01); *H02M 3/02* (2013.01); *Y02E 60/527* (2013.01); *Y02W 10/15* (2015.05)

(58) Field of Classification Search
CPC .. C02F 1/66; C02F 2001/46157; C02F 3/303; C02F 2201/46115; C02F 2201/46135; C02F 2201/4614; C02F 2201/4617; C02F 2201/4619; C02F 3/208; C02F 2209/40; Y02W 10/15; Y02E 60/527; H02M 3/02
See application file for complete search history.

(56) References Cited

U.S. PATENT DOCUMENTS

| | | | |
|---|---|---|---|
| 2010/0081014 A1* | 4/2010 | Tyce | H01M 10/441 429/2 |
| 2010/0304226 A1* | 12/2010 | Keller | H01M 8/16 429/401 |
| 2012/0070696 A1* | 3/2012 | Jin | C02F 3/005 429/2 |
| 2012/0132521 A1 | 5/2012 | Silver et al. | |
| 2012/0319495 A1* | 12/2012 | Muller | H02J 3/383 307/82 |
| 2013/0017415 A1 | 1/2013 | He | |
| 2014/0030555 A1 | 1/2014 | Winkler | |
| 2014/0069806 A1 | 3/2014 | Silver et al. | |
| 2015/0349350 A1 | 12/2015 | Liu | |

OTHER PUBLICATIONS

Jae-Do Park et al. "Hysteresis-Controller-Based Energy Harvesting Scheme for Microbial Fuel Cells With Parallel Operation Capability" IEEE Transactions on Energy Conversion, IEEE Service Center, Piscataway, NJ, US, vol. 27, No. 3, Sep. 1, 2012, XP011454666, ISSN: 0885-8969.

Wei-Feng Liu et al. "Microbial fuel cells for energy production from wastewaters: the way toward practical application" Journal of Zhejiang University Science A, Zheijiang University Press, CN vol. 15, No. 11, Nov. 9, 2014 XP036187352, ISSN: 1673-565X.

European Search Report in co-pending, related EP Application No. 17172641.7, dated Oct. 9, 2017.

\* cited by examiner

METHOD AND APPARATUS FOR BIO-ELECTRICALLY GENERATING POWER FROM ORGANIC INGREDIENTS OF A WASTE WATER

CROSS REFERENCE TO RELATED APPLICATIONS

The present invention claims priority to German Patent Application No. DE 10 2016 109 606.7 entitled "Verfahren and Vorrichtungen zur bioelektrischen Stromgewinnung aus organischen Inhaltsstoffen eines Abwassers" and filed on May 25, 2016.

FIELD OF THE INVENTION

The present invention relates to a method of bio-electrically or bio-electrochemically generating electric power from organic ingredients of a waste or sewage water which at least intermittently flows in a flow direction. More particular, the invention relates to a method in which an anode is immersed in the waste water in a first spatial area. Even more particular, the present invention relates to a method in which a cathode electrically connected to the anode is immersed in the waste water in a second spatial area and in which the waste water, before it gets into the second spatial area, is at least intermittently aerated. Further, the invention relates to an apparatus for bio-electrically generating electric power from organic ingredients of a waste or sewage water comprising an anode chamber which has an inlet and an outlet for the waste or sewage water and in which an anode is arranged, and a cathode electrically connected to the anode.

BACKGROUND OF THE INVENTION

A method and an apparatus for bio-electrochemical denitrification of fluids in which electric power may be harvested are known from WO 2011/006939 A2. In the known method, a preliminary sedimentation takes place in an anode cell in which an anode is arranged for bio-electrochemically converting carbon-containing compounds. Next, carbon is removed and a nitrification occurs in an aerobic reactor. A final sedimentation takes place in a cathode cell including a cathode for bio-electrochemical denitrification. In the aerobic reactor, a method of fluid clarification with sessile biofilms is executed. The anode cell and the cathode cell are spatially separated and not connected via a membrane; the fluid flows through the cells and the aerobic reactor continuously or in batches. Electrons are transported from the anode to the cathode via an electrical conductor, and protons are transported via the flow of the fluid. The proton or ion transport may further take place via a salt bridge provided between the anode cell and the cathode cell.

The conditions for harvesting relevant amounts of electric energy in the method and the apparatus known from WO 2011/006939 A2 are not good. Due to the spatial distance of the anode to the cathode and the correspondingly long electrical conductor connecting them, and due to the proton or ion transport via the flow of the medium or via the salt bridge, the electric internal resistance is very high, particularly when compared to the low voltage dropping between the anode and the cathode of typically less than 300 mV.

A method and an apparatus for bio-electrically producing hydrogen from organic ingredients is known from WO 2009/008709 A1. Here, an anode chamber in which an anode is arranged is separated from an cathode chamber in which a cathode is arranged by means of an ion-selective membrane permeable for protons. A biofilm is grown on the anode. During this growth, an external voltage is applied between the anode and the cathode. The fluid with the organic ingredients is acidified before it is supplied to the anode. The overall conditions are set such that the biofilm produces hydrogen.

Methods and apparatuses for generating electric energy from flowing waste water with organic ingredients are also known from US 2010/0304226 A1, US 2014/0030555 A1, and US 2012/0132521 A1.

U.S. Pat. No. 3,340,094 A discloses a method of directly producing electrical energy through the biochemical reaction of photosynthetic bacteria. This production of electrical energy takes place in a fuel cell whose anode and cathode can be connected to an alternator for conversion of the low voltage direct current produced by the fuel cell into alternating current whose voltage can be stepped up by a transformer.

There still is a need of a method and an apparatus for bio-electrically generating electric power from organic ingredients of a waste water at least intermittently flowing in a flow direction, which allows for an effective generation of electric power particularly in the processing of industrial and municipal waste waters in existing waste water treatment plants.

SUMMARY OF THE INVENTION

The present invention provides a method of bio-electrically generating electric power from organic ingredients of a waste water which at least intermittently flows in a flow direction. The method comprises immersing an anode in the waste water in a first spatial area, supplying oxygen to a cathode which is electrically connected to the anode and arranged in a second spatial area, delimiting the second spatial area from the first spatial area by means of a proton-permeable membrane, and increasing a voltage which is present between the anode and the cathode up to an increased voltage by means of a DC/DC converter located at a site of the anode and the cathode. Further, the method comprises charging a DC voltage link with the DC/DC converter and with at least one further DC/DC converter, the DC/DC converter and the at least one further DC/DC converter being connected in parallel to the DC voltage link. The at least one further DC/DC converter increases a further voltage being present between a further anode in said first spatial area or a further first spatial area and a further cathode in said second spatial area or a further second spatial area up to the increased voltage, and it is located at a site of the further anode and the further cathode.

Further, the present invention provides an apparatus for bio-electrically generating electric power from organic ingredients of a waste water. The apparatus comprises an anode chamber having an inlet and an outlet for the waste water, an anode being arranged in the anode chamber, and a cathode electrically connected to the anode. A channel horizontally extends through the anode chamber from the inlet to the outlet along the plate-shaped anode, the plate-shaped anode being immersed in the channel. The channel, at least section-wise, is laterally delimited by a proton-permeable membrane, the cathode being arranged outside of the anode chamber on the membrane. A voltage increasing DC/DC converter connected to the anode and the cathode at its input side and at least one further voltage increasing DC/DC converter connected to a further anode in the anode chamber and a further cathode arranged outside of the anode chamber on the membrane at its input side are arranged at or in the anode chamber. The voltage increasing DC/DC converter and the at least one further voltage increasing DC/DC converter are connected to a common DC voltage link at their output sides.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
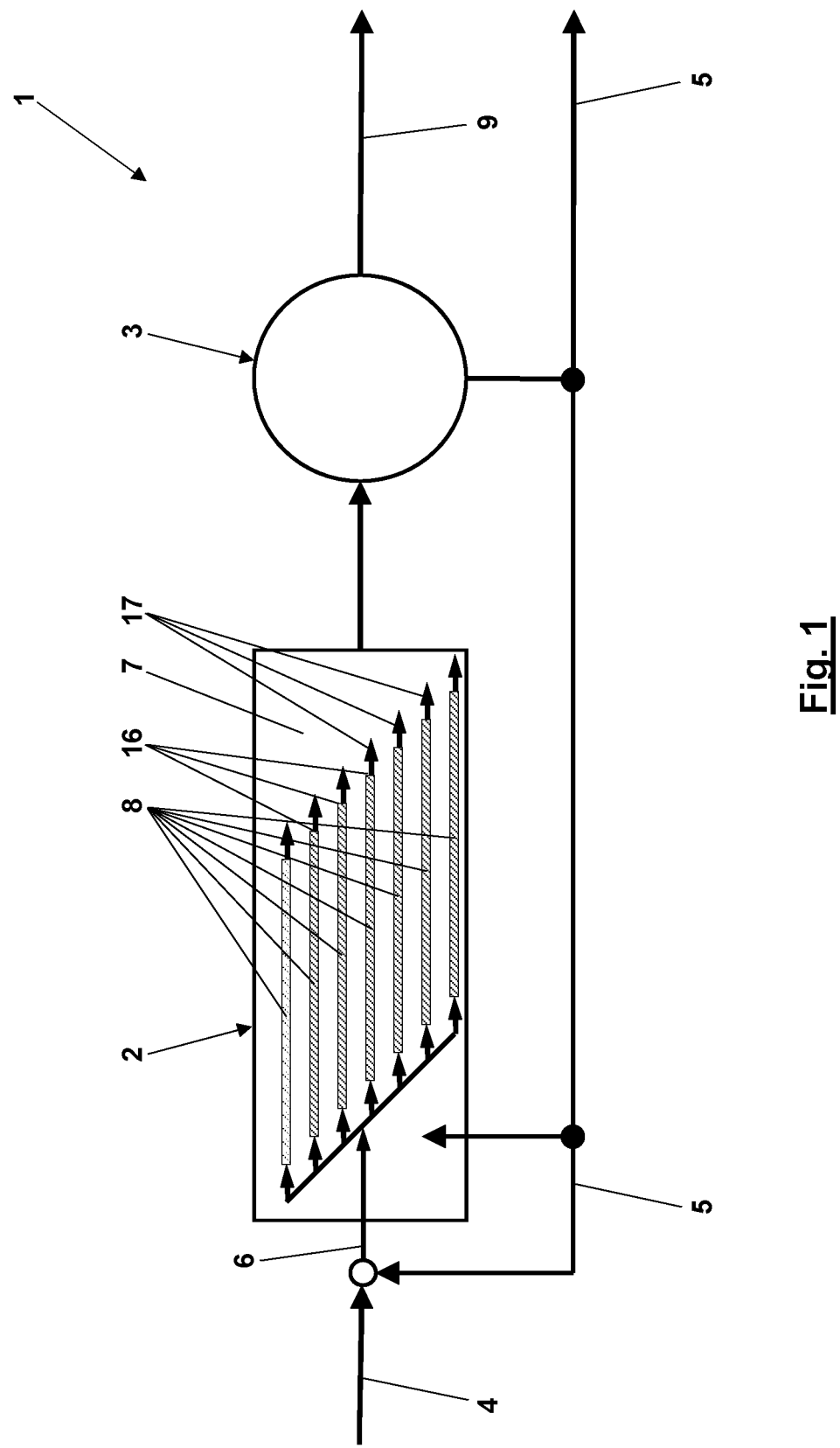
FIG. 1 schematically shows a waste water treatment plant comprising an embodiment of the apparatus according to the invention for carrying out an embodiment of the method according to the invention.

In the method according to the present invention for bio-electrically generating electric power from organic ingredients of a waste water which at least intermittently flows in a flow direction, wherein an anode is immersed in the waste water in a first spatial area, wherein oxygen is supplied to a cathode electrically connected to the anode and arranged in a second spatial area, particularly in that the cathode is immersed in the waste water, wherein the waste water, before it gets into the second spatial area, is at least intermittently aerated, the second spatial area is separated from the first spatial area by means of a proton-permeable membrane, and a voltage present between the cathode and the anode is increased to a higher voltage with a DC/DC-converter located close to the anode and the cathode. By means of this DC/DC converter and at least one further DC/DC converter which are connected in parallel to each other to a common DC voltage link, the common DC voltage link is charged, wherein the DC/DC converters are each connected to an anode in said first spatial area or a further spatial area and a cathode in said second spatial area or a further spatial area.

The indication that the waste water, before it gets into the second spatial area, is at least intermittently aerated includes the option that the waste water is, continuously or intermittently, aerated in the second spatial area only. It is also possible to supply oxygen to the cathode in the second spatial area in another way, like for example, in that the cathode is immersed in another oxygen-containing liquid or in an oxygen-containing gas, such as air, in the second spatial area.

The proton-permeable membrane may be an ion-selective membrane like it is known from fuel cell technology. However, the proton-permeable membrane needs not to be ion-selective, i.e. it may generally also be permeable for other objects than protons. It may, for example, consist of a porous material which is effective as a separator. Such materials are known from battery technology, and they are often cheaper than special ion-selective materials.

In the method according to the invention, the plurality of DC/DC converters connects a plurality of anodes in the same first area and a plurality of cathodes in the same second spatial area or a plurality of anodes and cathodes in separate first and second spatial areas to the common DC voltage link. Electric differences between the individual anode/cathode pairs can be compensated for by the individual DC/DC converters. The DC voltage link may thus be held at a constant higher voltage. At this higher voltage, for example, a load may be directly or via a further DC/DC or DC/AC converter supplied with electric power. An intermediate energy storage, like for example a capacitor or an accumulator, can be connected to the DC voltage link.

The cathode is electrically connected to the anode in such a way that a flow or current of electrons which corresponds to a flow or current of protons flowing through the proton-permeable membrane may flow from the anode to the cathode.

By means of the method according to the invention, it is ensured that the internal resistance for the electrical current flowing between the cathode and the anode is kept small. For this purpose, the first spatial area in which the anode is arranged and the second spatial area in which the cathode is arranged are only spatially separated by the proton-permeable membrane so that the protons may get on a short way and with only little electrical resistance from the anode to the cathode. The electrons flowing between the anode and the cathode only flow at the low voltage present between the cathode and the anode to and from the DC/DC converter which is arranged close to the anode and the cathode and which increases or steps up this low voltage. Due to the increased voltage, the ohmic losses in further transferring the electric energy are reduced. Further, variations of the voltage between the cathode and the anode may be compensated for by the respective DC/DC converter so that, despite these variations, a constant higher voltage may be provided in the DC voltage link. Effectively, the internal resistance between the anode and the cathode is reduced by means of the method according to the present invention to such an extent that even low voltages between the cathode and the anode of only 10 to 250 mV which often practically occur in bio-electrical generation of voltages may be exploited.

The first and the second spatial area may at least in so far be arranged parallel with regard to each other in that not the entire waste water passes through both the first and second spatial area. Also in this case, the second spatial area—with regard to that part of the waste water flowing through the first spatial area—may be arranged downstream of the first spatial area, and the waste water may be aerated behind the first spatial area.

Particularly, the first spatial area, in which the anodes are arranged, may be the interior of an anode chamber which is arranged in an aeration basin whose remaining volume defines the second spatial area and to which the waste water is at least intermittently supplied such that the waste water out of the anode chamber and over a barrier enters the aeration basin. The waste water is thus supplied to the aeration basin through the anode chamber which is arranged within the aeration basin but whose volume is delimited with regard to the aeration basin. Thus, the waste water in the anode chamber is not yet aerated, i.e. treated with oxygen. This only occurs after the waste water flows over the barrier into the volume of the aeration basin outside the anode chamber. The aeration basin may be, but needs not to be continuously aerated. The aeration may be adjusted such that, in the method according to the invention, besides the generation of electric power, also denitrification is achieved in the aeration basin. The arrangement of the anode chamber in an existing aeration basin allows for an application of the method according to the present invention with particularly low constructive effort in existing industrial and municipal waste water treatment plants.

During the generation of electric power, waste water is preferably supplied to the anode chamber in such a way that a continuous flow velocity of the waste water along the anode of not more than 0.4 m/s and preferably in a range from 0.02 to 0.08 m/s is achieved. These flow velocities allow for a populating of the anode with microorganisms suitable for the bio-electrical generation of electric power and afterwards for a take-up of the ingredients of the waste water to be converted by the microorganisms.

If the anode chamber is intermittently supplied with waste water in such a way that a flow, particularly a pulsating flow, which has a maximum flow velocity of the waste water along the anode of more than 1 m/s and preferably in a range from 2 to 5 m/s, is achieved, the anode as well as the membrane may be purged free from any excessively grown microorganisms. The freed biological material gets over the barrier out of the anode chamber into the aeration basin.

Gases set free at the anode, particularly methane, may be removed from an upwardly and laterally closed head space of the anode chamber and exploited.

In the method according to the present invention, the cathode may be arranged on the membrane and may be combined with the membrane into a cathode membrane unit. In this way, there are both constructive advantages and electric advantages with regard to the internal electrical resistance between the cathode and the anode.

The anode may be centrally arranged between two partial sections of the cathode-membrane-unit which are arranged parallel to each other. In this arrangement, the plate-shaped or two-dimensionally formed anode is bio-electrically active with both of its main surfaces facing two partial sections of the cathode-membrane-unit, whereas the cathodes are essentially only electrically active with their respective surface facing the membrane and biologically active by being populated with bacteria with their surface facing away from the membrane.

In the method according to the present invention, the waste water, upstream of the first spatial area in which the anode is arranged, may be pretreated by means of acidifying or acidulating to increase the portion of biologically easily degradable waste water ingredients. The acidification may, for example, take place analogously to a two-stage generation of biogas by means of an anaerobic preacidification.

By means of the DC/DC converters, the voltage which is present between the respective cathode and the respective anode may be adjusted by adjusting the current flowing at this voltage. This may be done with the purpose of maximizing an available electric power. In other words, for example a maximum power point (MPP) tracking may be carried out by means of the DC/DC converters. Here, however, the goal should always be to maximize the available electric power sustainably, i.e. for a longer interval of time. A short-term increase of power may be possible at a voltage, which harms the microorganisms at the anode and/or the cathode. Thus, it is also possible to adjust any other operation point of the DC/DC converters along the characteristics of the microbial fuel cells operating according to the present invention to empirically or experimentally determine the most advantages operation points for the respective population of microorganisms.

Further, an external voltage may be temporarily applied between the respective cathode and the respective anode by means of the DC/DC converters. This may be useful for enhancing a populating of the anode and/or the cathode with certain microorganisms. In other words, the voltage applied may also be used to select those growing microorganisms which are suitable for the desired purpose, i.e. for the generation of electric power, combined with a denitrification if desired.

The DC/DC converters may also be used to control a current flowing between the cathode and the anode to a preset value to, for example, provide certain electric conditions for the microorganisms at the anode and/or the cathode.

In the apparatus according to the present invention for bio-electrically generating electric power from organic ingredients of a waste water comprising an anode chamber which has an inlet and an outlet for waste water and in which an anode is arranged, and a cathode electrically connected with the anode, a channel horizontally extends through the anode chamber from the inlet to the outlet and along the plate-shaped anode which vertically immerges in the channel. Laterally, the channel is at least section-wise delimited by a proton-permeable membrane, and the cathode is arranged outside the anode chamber on the membrane. A plurality of step-up DC/DC converters which are located at or in the anode chamber are connected to different parts of the cathode and the anode at its input side. To ensure short current paths from each point of the anode and/or the cathode, the different parts of the anode and/or the cathode are connected to different DC/DC converters of the plurality of DC/DC converters. Over longer distances, the electric currents only flows at the voltage increased by the partial DC/DC converters.

The anode chamber may, for example, be arranged in an existing aeration basin of a waste water treatment plant. Here, the outlet at the end of the channel may be provided with a barrier for the waste water over which the waste water flows out of the anode chamber into the neighboring volume of the aeration basin.

The anode chamber may include two partial chambers which are parallel with regard to each other at a free distance and through which the waste water flows in opposite directions so that the inlet and the outlet of the anode chamber are arranged side by side. Thus, by means of integrating the anode chamber in an aeration basin, mainly the volume of the aeration basin is reduced by the volume of the anode chamber. A waste water flowing via the anode chamber into the aeration basin, however, still gets at the same point into the aerated volume of the aerating basin.

The anode chamber may have a head space which has a gas removal connector but which is otherwise closed laterally and upwardly to remove gases which are set free in the anode chamber. Besides the inlet and the outlet for the waste water, the anode chamber may otherwise be completely closed.

The anode may be centrally arranged in the anode chamber between two parallel partial sections of the membrane. Here, a distance of the membrane to the anode is preferably smaller than 10 cm, more preferably it is in a range from 0.5 to 2 cm.

A length of the anode between the inlet and the outlet is preferably at least 0.5 m and more preferably between 3 m and 10 m. At the flow velocities mentioned above, the waste water thus flows along the anode for a sufficiently long interval of time to make use of its ingredients suitable for the production of electric power.

A surface area of the cathode and a surface area of the membrane are preferably greater by at least a factor of 2 or more preferably by a factor in range of 3 to 5 than a surface area of the anode. Here, the factor between the surface areas does not necessarily relate to all surfaces of the cathode, membrane and anode but only to their surfaces extending along their planes of main extension.

In the apparatus according to the present invention, the cathode is preferably arranged on the membrane and combined with the membrane to a cathode-membrane-unit. Due to the cathode, this cathode-membrane-unit has a dimensionally stable design.

The anode and/or the membrane and the cathode may be supported at a dimensionally stable chamber basic structure in an exchangeable way. Here, the combination of the cathode with the membrane to a cathode-membrane-unit is an advantage both in case of a replacement and during initial assembly.

The anode and/or the cathode may comprise a grid, perforated plate or mesh of a metallic conductor which is embedded in an electrically conductive plastic material and which is connected to the respective DC/DC converter. The conductive plastic material may have a roughened surface for an easy populating with microorganisms. The slightly increased ohmic resistance of the electrically conductive plastic material has to be overcome by the electrons only up to the metallic conductor which leads them on a short way to the DC/DC converter.

The connecting lines connecting the DC/DC converter to the anode and the cathode are not longer than 3 m, preferably not longer than 0.5 m. It is even more preferred if no current path from any point of the anode and the cathode to the respective DC/DC converter is longer than 3 m or by more than 1 m or even 0.5 m longer than a vertical extension of the respective anode or cathode. In this way, the ohmic internal resistance between the anode and the cathode is kept small.

The DC/DC converter may be bi-directional to be able to also apply an external voltage between the anode and the cathode. The DC/DC converter may have an MPP tracker to be able to maximize the available electric power. Further, the DC/DC converter may have a current controller to control the current flowing between the anode and the cathode to a predetermined value.

Now referring in greater detail to the drawings, a waste water treatment plant 1 depicted in FIG. 1 includes an aeration basin 2 and a clarification basin 3. Waste water 4 is supplied to an inlet 6 of the aeration basin 2, optionally together with fed back sludge 5. In the presented embodiment, the inlet 6 does not directly open into the free volume 7 of the aeration basin 2 but at first leads into a plurality of anode chambers 8 connected in parallel. Only after re-emerging out of the respective anode chamber 8, the waste water 4 gets into the free volume 7 of the aeration basin 2. In the aeration basin 2 the waste water 4 is at least intermittently aerated. After its treatment in the aeration basin 2, the waste water is transferred into the clarification basin 3. Here, the waste water is separated into clarified waste water 9 and the sludge 5 which is partially fed back through the anode chamber 8 and/or directly into the aeration basin 2.

Figure 2:
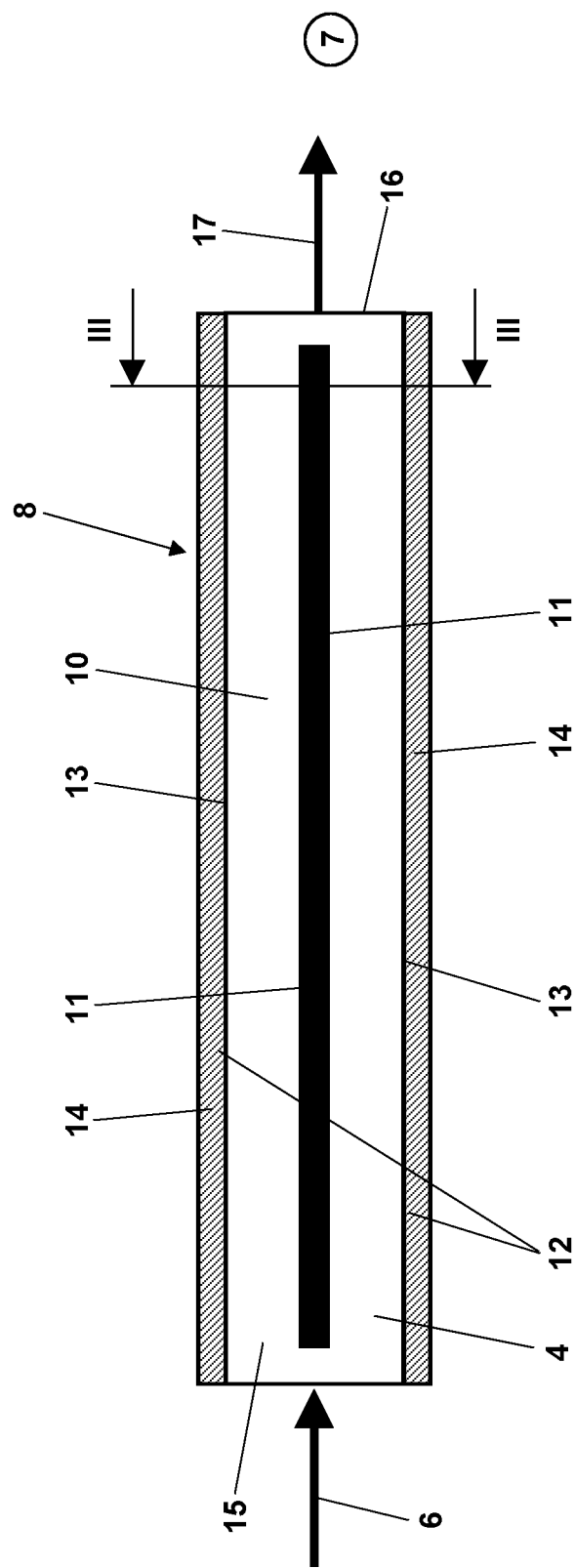
FIG. 2 shows a longitudinal section through an anode chamber of the embodiment of the apparatus according to FIG. 1.
Figure 3:
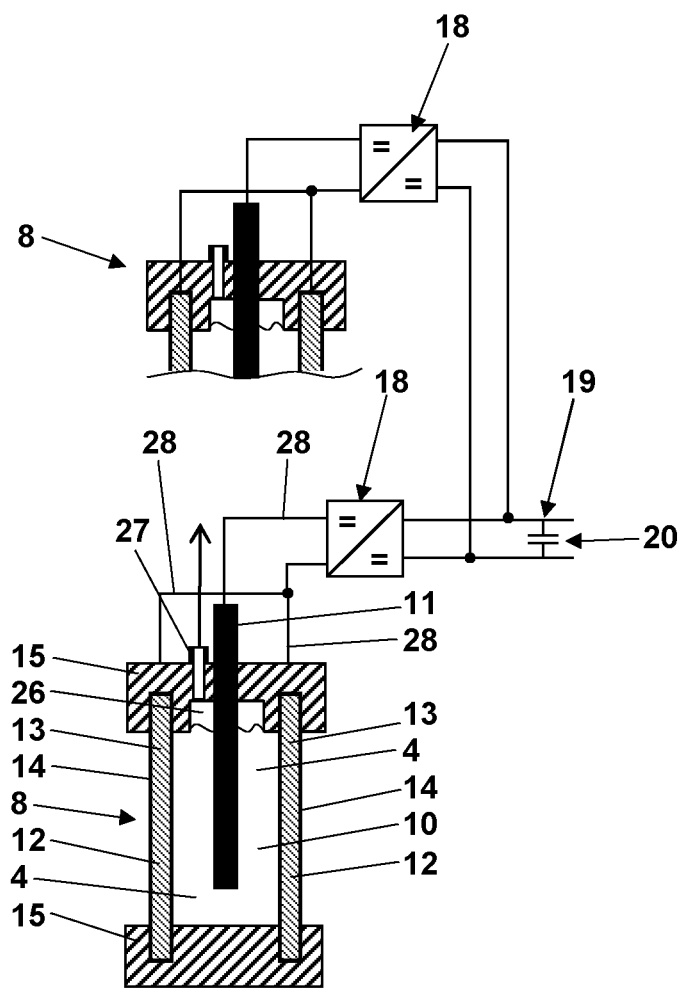
FIG. 3 shows a vertical section through the anode chamber according to FIG. 2 along the section line III-Ill depicted in FIG. 2.

Electric energy is generated by means of the anode chambers 8. For this purpose, each anode chamber 8 is designed as depicted in FIGS. 2 and 3. A channel 10 extends through the anode chamber 8, in which a plate-shaped anode 11 is vertically immersed from above. Laterally, the channel 10 is delimited by cathode-membrane-units 12 which each include an ion-selective and particularly proton-permeable membrane 13 at its inside and a cathode 14 arranged at its outside. The anode 11 and the cathode-membrane-units 12 are replaceably supported at a dimensionally stable chamber basic structure 15. At the end of the anode chamber 8 facing away from the inlet 6, a barrier 16 is provided as an outlet for an overflow 17 of the waste water into the free volume 7 of the aeration basin. Above the cathode-membrane-unit 12 covered with the waste water 4, the anode chamber 8 has a head space 26 with a gas removal connector 27.

The anode 11 and the cathodes 14 are connected to a DC/DC converter 18 which is arranged at the site of, i.e. close the anode 11 and the cathodes 14, like for example directly at or in the anode chamber 8, to pick up the voltage present between the anode 11 and the cathodes 14 with short leads 28. The DC/DC converter 18 increases this voltage and charges a DC voltage link 19 in which a capacitor 20 is arranged as an energy intermediate storage. By means of the DC/DC converter 18, it is also possible to apply an external voltage between the anode 11 and the cathodes 14 to enhance a populating of at least one of the anode 11 and the cathodes 14 selectively with such microorganisms which are suitable for converting ingredients of the waste water getting into the anode chamber 8 and generating electric power therefrom. The waste water at the anode 11 and at the cathodes 14 generally differs in that only the waste water at the cathodes 14 has been subjected to the aeration in the aeration basin 2. The resulting difference in the composition of the waste water is used in the generation of electric power according to the present invention.

As indcted in FIG. 3, the DC/DC converters 18 of all anode chambers 8 of FIG. 1 charged the same DC voltage link 19. Each DC/DC-converter 18 may be bi-directional and equipped with an MPP-Tracker and a current controller.

Figure 4:
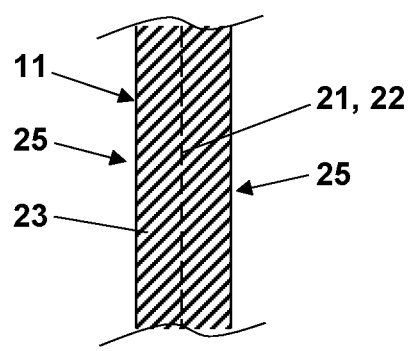
FIG. 4 is a sectional view of a detail of an anode in the anode chamber according to FIGS. 2 and 3.
Figure 5:
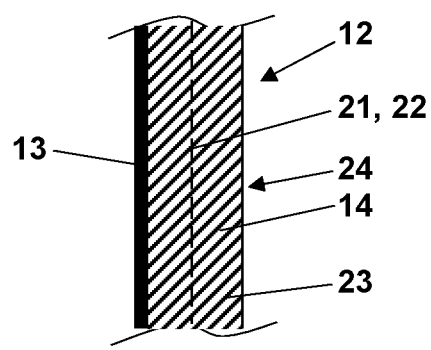
FIG. 5 is a sectional view of a detail of a cathode-membrane-unit which is delimiting sections of the anode chamber according to FIGS. 2 and 3.

FIG. 4 illustrates the interior design of the anode 11. It includes a grid 21 of a metallic electric conductor 22 which is embedded into an electrically conductive plastic material 23. The interior construction of the cathode-membrane-unit 12 depicted in FIG. 5 additionally includes the membrane 13 on one main surface of the cathode 14. Here, between the massive cathode 14 and the membrane 13, an open porous intermediate layer may be provided. As a rule, populating the cathode 14 with microorganisms is primarily only intended on its surface 24 facing away from the membrane 13. On the other hand, populating the anode 11 with microorganisms always takes place at both of its surfaces 25 extending along its plane of main extension.

There are indications that biofilms that populate the anode side of the membrane 13 are supplied with oxygen which diffuses through the membrane 13. Thus, nitrificators may populate the membrane in the anode chamber 8 and thus convert ammonia into nitrate. This may reduce the yield of electric power. However, the waste water 4 is purified better. In an ideal case, the processes in the anode chamber 8 are controlled such that two reactions take place simultaneously, i.e. one reaction for generation of electric power at the anode and one reaction for nitrification at the membrane 13.

Figure 6:
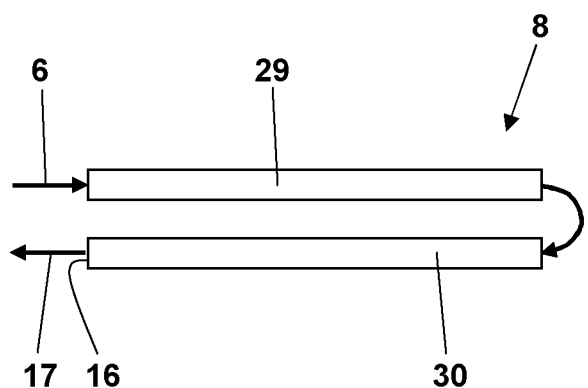
FIG. 6 is a schematic drawing of a further embodiment of an anode chamber.

FIG. 6 schematically illustrates a further embodiment of an anode chamber 8 that has two partial chambers 29 and 30 which are parallel with regard to each other, which are arranged at a free lateral distance, and which are connected in series in such a way that the waste water flows through the two partial chambers in opposite flow directions. Thus, the overflow 17 of the waste water re-emerges from the anode chamber close to the inlet 6. When the anode chamber 8 according to FIG. 6 is arranged in an aeration basin 2 according to FIG. 1, this only reduces the free volume 7 of the aeration basin 2 but does not shorten the path of the waste water 4 through the aeration basin 2.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of bio-electrically generating electric power from organic ingredients of a waste water which at least intermittently flows in a flow direction, the method comprising:
    immersing an anode in the waste water in a first spatial area,
    supplying oxygen to a cathode which is electrically connected to the anode and arranged in a second spatial area,
    delimiting the second spatial area from the first spatial area by means of proton-permeable membrane,
    increasing a voltage which is present between the anode and the cathode up to an increased voltage by means of a DC/DC converter located at the anode and the cathode, and
    charging a DC voltage link with the DC/DC converter and with at least one further DC/DC converter, the DC/DC converter and the at least one further DC/DC converter being connected in parallel to the DC voltage link, and the at least one further DC/DC converter increasing a further voltage being present between a further anode in said first spatial area or a further first spatial area and a further cathode in said second spatial area or a further second spatial area up to the increased voltage and being located at the further anode and the further cathode
    wherein the first spatial area is a channel of an anode chamber arranged in an aeration basin of a waste water treatment plant, wherein the channel horizontally extends through the anode chamber from an inlet of the anode chamber along the anode up to a barrier provided at an end of the anode chamber as an outlet for an overflow of the waste water into a free volume of the aeration basin and wherein the free volume of the aeration basin defines the second spatial area,
    wherein the anode chamber is at least intermittently supplied with the waste water in such a way that the anode and the further anode are immersed in the waste water and that the waste water gets out of the anode chamber over the barrier into the free volume of the aeration basin,
    wherein the cathode and the further cathode are immersed in the waste water in the free volume of the aeration basin, and
    wherein the waste water is aerated in the free volume of the aeration basin.

2. The method of claim 1,
    wherein the first spatial area is temporarily supplied with the waste water in such a way that a continuous flow velocity of the waste water along the anode of
    not more than 0.4 m/s
    is achieved, and
    wherein the first spatial area is further intermittently supplied with the waste water in such a way that a purging flow with a peak flow velocity of the waste water along the anode of
    more than 1 m/s and
    is achieved.

3. The method of claim 1, wherein gas is removed from an upwardly and laterally closed head space of the first spatial area.

4. The method of claim 1, wherein the cathode is arranged on the membrane and combined with the membrane to form a cathode-membrane-unit, and wherein the anode is centrally arranged between two parallel partial sections of the cathode-membrane-unit.

5. The method of claim 1, wherein the waste water, upstream of the first spatial area, is acidified or acidulated.

6. The method of claim 1, wherein each of the DC/DC converters is used for at least one of
    adjusting the voltage between the cathode and the anode in such a way that an available electric power is maximized;
    temporarily applying an external voltage between the respective cathode or further cathode and the respective anode or further anode; and
    controlling an electric current flowing between the cathode and the anode such that the current has a predetermined amperage.

7. The method of claim 2, wherein the first spatial area is temporarily supplied with the waste water in such a way that the continuous flow velocity is in a range of 0.02 to 0.08 m/s.

8. The method of claim 2, wherein the first spatial area is further intermittently supplied with the waste water in such a way that the peak flow velocity of the waste water along the anode is in a range of 2 to 5 m/s.

9. A method of bio-electrically generating electric power from organic ingredients of a waste water which at least intermittently flows in a flow direction, the method comprising:
    laterally delimiting a channel horizontally extending along a plate-shaped anode in an anode chamber by cathode-membrane-units which each include a proton-permeable membrane at its inside and a cathode arranged at its outside,
    supporting the cathode-membrane-units and the anode at a dimensionally stable chamber basic structure of the anode chamber,
    arranging the anode chamber within an aeration basin of a waste water treatment plant, wherein the channel of the anode chamber horizontally extends up to a barrier provided at an end of the anode chamber as an outlet for an overflow of the waste water into a free volume of the aeration basin,
    supplying the waste water to the aeration basin through the anode chamber, wherein the anode is immersed in the waste water in the channel and wherein the waste water gets out of the anode chamber over the barrier into the free volume of the aeration basin,
    aerating the waste water in the free volume of the aeration basin such as to supply oxygen to a the cathodes of the cathode-membrane-units arranged in the free volume of the aeration basin, increasing a voltage which is present between the anode and the cathodes of the cathode-membrane-units up to an increased voltage by means of a DC/DC converter located at the anode and the cathodes, and charging a DC voltage link with the DC/DC converter and with at least one further DC/DC converter, the DC/DC converter and the at least one further DC/DC converter being connected in parallel to the DC voltage link, and the at least one further DC/DC converter increasing a further voltage present between a further anode in said channel or a further channel and further cathodes in the free volume of the aeration basin up to the increased voltage, and the at least one further DC/DC converter being located at the further anode and the further cathodes.

10. The method of claim 9, wherein the waste water is temporarily supplied to the aeration basin through the anode chamber in such a way that a continuous flow velocity of the waste water along the anode of not more than 0.4 m/s is achieved, and wherein the waste water is further intermittently supplied to the aeration basin through the anode chamber in such a way that a purging flow with a peak flow velocity of the waste water along the anode of more than 1 m/s is achieved.

11. The method of claim 10, wherein the waste water is temporarily supplied to the aeration basin through the anode chamber in such a way that the continuous flow velocity of the waste water along the anode is in a range of 0.02 to 0.08 m/s.

12. The method of claim 10, wherein the waste water is further intermittently supplied to the aeration basin through the anode chamber in such a way that the peak flow velocity of the waste water along the anode is in a range of 2 to 5 m/s.

13. The method of claim 9, wherein gas is removed from an upwardly and laterally closed head space of the anode chamber.

14. The method of claim 9, wherein the anode is centrally arranged between two parallel partial sections of the cathode-membrane-units.

15. The method of claim 9, wherein the waste water, upstream of the anode chamber, is acidified or acidulated.

16. The method of claim 9, wherein each of the DC/DC converters is used for at least one of adjusting the voltage between the cathode and the anodes in such a way that an available electric power is maximized;

temporarily applying an external voltage between the respective cathodes or further cathodes and the respective anode or further anode; and controlling an electric current flowing between the cathodes and the anode such that the current has a predetermined amperage.

\* \* \* \* \*